United States Patent
Barfield et al.

(10) Patent No.: US 8,055,761 B2
(45) Date of Patent: Nov. 8, 2011

(54) METHOD AND APPARATUS FOR PROVIDING TRANSPARENT NETWORK CONNECTIVITY

(75) Inventors: Janel Guillory Barfield, Round Rock, TX (US); Nancy N. Li, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 11/669,285

(22) Filed: Jan. 31, 2007

(65) Prior Publication Data

US 2008/0183857 A1 Jul. 31, 2008

(51) Int. Cl.
*G06F 15/173* (2006.01)

(52) U.S. Cl. ........ 709/224; 709/223; 709/225; 709/226; 709/227; 709/228; 709/229; 370/395.2; 370/395.21; 370/395.3

(58) Field of Classification Search ........... 709/223–229
See application file for complete search history.

(56) References Cited

U.S. PATENT DOCUMENTS

| | | | |
|---|---|---|---|
| 5,608,865 A | 3/1997 | Midgely | |
| 5,751,965 A * | 5/1998 | Mayo et al. | 709/224 |
| 5,977,957 A * | 11/1999 | Miller et al. | 345/174 |
| 6,070,184 A * | 5/2000 | Blount et al. | 709/200 |
| 6,121,998 A * | 9/2000 | Voois et al. | 348/14.13 |
| 6,188,756 B1 * | 2/2001 | Mashinsky | 379/207.04 |
| 6,466,328 B1 * | 10/2002 | Bradley et al. | 358/1.15 |
| 6,640,230 B1 * | 10/2003 | Alexander et al. | 1/1 |
| 6,715,143 B1 * | 3/2004 | Chantrain et al. | 717/174 |
| 6,829,638 B1 * | 12/2004 | McBrearty et al. | 709/219 |
| 6,848,000 B1 * | 1/2005 | Reynolds | 709/226 |
| 7,009,952 B1 | 3/2006 | Razavilar | |
| 7,079,830 B2 * | 7/2006 | Critz et al. | 455/403 |
| 7,079,861 B2 * | 7/2006 | Critz et al. | 455/552.1 |
| 7,096,155 B2 * | 8/2006 | Chen et al. | 702/182 |
| 7,139,811 B2 * | 11/2006 | Lev Ran et al. | 709/217 |
| 7,254,726 B2 * | 8/2007 | Kwatra et al. | 713/320 |
| 7,711,788 B2 * | 5/2010 | Lev Ran et al. | 709/213 |
| 7,818,025 B2 * | 10/2010 | Zhao et al. | 455/550.1 |
| 2001/0054113 A1 * | 12/2001 | Nishida | 709/245 |
| 2001/0056503 A1 * | 12/2001 | Hibbard | 709/250 |

(Continued)

OTHER PUBLICATIONS

Adobe—Adobe Acrobat Family—About Adobe Download Manager (downloaded from www.adobe.com on Dec. 12, 2006).

(Continued)

*Primary Examiner* — John Follansbee
*Assistant Examiner* — Backhean Tiv
(74) *Attorney, Agent, or Firm* — Matt Talpis; Mark P Kahler (57) ABSTRACT

A client information handling system (IHS) connects to a network in a manner that provides transparent network connectivity. In one embodiment, the client IHS includes a polling application that monitors the network connection to determine if the client IHS exhibits a connected status or a disconnected status. An interceptor application in the client IHS permits transmission of a request for a network task from the client IHS if the client IHS currently exhibits a connected status. However, the interceptor application intercepts and stores a request for a network task if the client IHS currently exhibits a disconnected status. At a later time when the client IHS again exhibits a connected status, the interceptor application transmits the stored request over the network. In this manner, the user of the client IHS experiences transparent network connectivity and need not worry with respect to the network connection status of the client IHS at any particular point in time.

12 Claims, 4 Drawing Sheets

U.S. PATENT DOCUMENTS

| | | |
|---|---|---|
| 2002/0167898 A1 | 11/2002 | Thang |
| 2003/0084165 A1* | 5/2003 | Kjellberg et al. ............. 709/227 |
| 2004/0003266 A1* | 1/2004 | Moshir et al. ................ 713/191 |
| 2004/0019674 A1* | 1/2004 | Stevens et al. ............... 709/224 |
| 2005/0086342 A1 | 4/2005 | Burt |
| 2005/0105513 A1* | 5/2005 | Sullivan et al. .............. 370/352 |
| 2005/0120306 A1* | 6/2005 | Klassen et al. ............... 715/765 |
| 2006/0093126 A1* | 5/2006 | Wesen ..................... 379/265.09 |
| 2006/0101047 A1 | 5/2006 | Rice |
| 2006/0248183 A1* | 11/2006 | Barton ......................... 709/224 |
| 2007/0239725 A1* | 10/2007 | Bhat et al. ..................... 707/10 |
| 2008/0016197 A1* | 1/2008 | Hardy et al. ................. 709/223 |
| 2008/0177994 A1* | 7/2008 | Mayer ............................. 713/2 |
| 2008/0183857 A1* | 7/2008 | Barfield et al. .............. 709/224 |
| 2008/0189358 A1* | 8/2008 | Charles ........................ 709/203 |
| 2009/0131090 A1* | 5/2009 | Jo et al. ........................ 455/466 |
| 2010/0169392 A1* | 7/2010 | Lev Ran et al. .............. 707/827 |
| 2011/0034199 A1* | 2/2011 | Zhao et al. ................... 455/510 |

OTHER PUBLICATIONS

Tonec—Internet Download Manager, Tonec, Inc. (downloaded from www.internetdownloadmanager.com on Dec. 12, 2006).

* cited by examiner

FIG. 1

FIG. 3A
INTERCEPTOR APPLICATION 300

FIG. 3B
INTERCEPTOR APPLICATION 300

FIG. 3C

INTERCEPTOR APPLICATION

300

METHOD AND APPARATUS FOR PROVIDING TRANSPARENT NETWORK CONNECTIVITY

TECHNICAL FIELD OF THE INVENTION

The disclosures herein relate generally to communication networks, and more particularly to handling network communications when a client system or other communication device loses a network connection.

BACKGROUND

In both the modern office and home environments, it is common to connect a client information handling system (client IHS) to a host or server via a network therebetween. Unfortunately, the network that connects the client IHS to the server may experience occasional service outages that effectively disconnect the client IHS from the network. This of course interrupts any communication that the client IHS may conduct with the server.

Currently, it is typically the user's responsibility to be aware of whether the client IHS has an active network connection or an inactive network connection. In other words, it's up to the user to determine if the network is available to perform a network related task. If the network is not available, then generally the network related task is not performable at that time. Some software applications attempt to address this problem. For example, some client email programs may maintain a local replica of a mail database on the client IHS. When the user composes an email message and selects "send", the email message remains in a local replica database in the client IHS until a network connection is available. If the client IHS currently has an active network connection, then the client IHS immediately sends the email message over the network to the mail server. However, if the client IHS does not currently have an active network connection, such as during a mail server outage, then the client IHS saves the message in its database and sends the message once the network connection again becomes available. While this approach is helpful, unfortunately it only solves the problem if the particular software application in use includes this feature.

What is needed is a method and apparatus that relieves the user of the burden of determining when a client IHS has a network connection to perform network related tasks.

SUMMARY

Accordingly, in one embodiment, a method is disclosed for communicating over a network between a client and a server. The method includes monitoring the network, by a polling application in the client, to determine if the client currently exhibits a network connected status or a network disconnected status. The method also includes transmitting, by the client, a request for a network task over the network if the client currently exhibits the network connected status. The method further includes intercepting, by an interceptor application in the client, a request for a network task and storing the request for a network task in a data store if the client currently exhibits the network disconnected status.

In another embodiment, a client information handling system (IHS) is disclosed that includes a processor and a data store coupled to the processor. The client IHS also includes a memory that is coupled to the processor. The memory includes a polling application that monitors a network to determine if the client IHS currently exhibits a network connected status or a network disconnected status. The memory also includes an interceptor application that communicates with the polling application. The interceptor application transmits a request for a network task over the network when the polling application determines that the client IHS currently exhibits the network connected status. The interceptor application intercepts a request for a network task and stores the request for a network task in the data store when the polling application determines that the client IHS currently exhibits the network disconnected status. In practice, the polling application and interceptor application may be stored in non-volatile storage such as the data store before being loaded into memory for execution by the processor.

In yet another embodiment, a computer program product is disclosed that is stored on a computer operable medium. The computer program product controls a network connection of a client information handling system (IHS) to a network. The computer program product includes a polling application that includes instructions for monitoring the network to determine if the client IHS currently exhibits a network connected status or a network disconnected status. The computer program product also includes an interceptor application that includes instructions for communicating with the polling application. The interceptor application includes instructions for transmitting a request for a network task over the network when the polling application determines that the client IHS currently exhibits the network connected status. The interceptor application also includes instructions for intercepting a request for a network task and storing the request for a network task in the data store when the polling application determines that the client IHS currently exhibits the network disconnected status.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
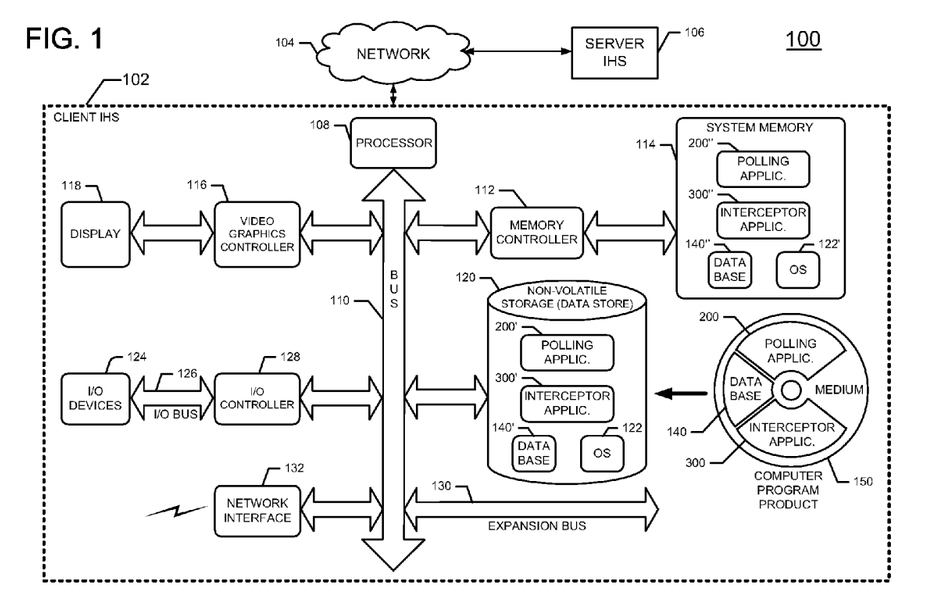
FIG. 1 shows a block diagram of the disclosed networked system.

FIG. 1 shows a block diagram of the disclosed networked system 100. System 100 includes a client information handling system (IHS) 102 that couples via network 104 to a server IHS 106. Network 104 may be virtually any electronic connection such as a local area network (LAN), a wide area network (WAN), an IP-based network or other wired or wireless network connection.

Client IHS 102 includes a processor 108 that couples to a bus 110. A memory controller 112 couples system memory 114 to bus 110. A video graphics controller 116 couples display 118 to bus 110. Client IHS 102 includes nonvolatile storage 120, such as a hard disk drive, CD drive, DVD drive, or other nonvolatile storage that couples to bus 110 to provide client IHS 102 with permanent storage of information. Nonvolatile storage 120 is a form of data store. An operating system (OS) 122 loads from nonvolatile storage 120 to memory 114 as OS 122' to govern the operation of client IHS 102. I/O devices 124, such as a keyboard and a mouse pointing device, couple via I/O bus 126 and I/O controller 128 to bus 110. One or more expansion busses 130, such as USB, IEEE 1394 bus, ATA, SATA, PCI, PCIE and other busses, couple to bus 110 to facilitate the connection of peripherals and devices to client IHS 102. A network interface 132 couples to bus 110 to enable client IHS 102 to connect by wire or wirelessly to network 104 and other IHSs such as server IHS 106. Client IHS 102 may take many forms. For example, client IHS 102 may take the form of a desktop, server, portable, laptop, notebook, or other form factor computer or data processing system. Client IHS 102 may also take other form factors such as a personal digital assistant (PDA), a gaming device, a portable telephone device, a communication device or other devices that include a processor and memory.

Client IHS 102 employs a polling application 200 that performs a polling test to determine if the client IHS's coupling to network 104 is active. In other words, the polling application 200 of client 102 performs a test to see if client 102 is currently connected to the network. If the network connection is active when a user of client IHS 102 attempts a network task, then client IHS 102 continues forward and performs the network task over the network connection. The client IHS 102 thus exhibits a connected status for such an operation. However, if the polling application 200 determines that the network connection exhibits a disconnected status when the user of client IHS 102 attempts a network task, then polling application 200 informs an interceptor application 300 of this disconnected status. In response to the disconnected status, interceptor application 300 intercepts and stores the requested network task and associated information in client IHS 102 for later use when the network connection returns to a connected status. The interceptor application 300 continues intercepting and storing requested networks tasks until restoration of the network connection to a connected status.

Before using the disclosed apparatus and methodology, the user or other person loads polling application 200, interceptor application 300 and a database application 140 on non-volatile storage 120 of client IHS 102. FIG. 1 shows a computer program product 150 that includes polling application 200, interceptor application 300 and database application 140. Computer program product 150 may be in the form of a disk, cartridge or any other medium suitable for storing digital program information. After computer program product 150 loads on non-volatile storage 120, storage 120 then stores a permanent copy of the following applications: polling application 200', interceptor application 300', database application 140', as well as operating system (OS) 122. At some point in time after boot-up or initialization of client IHS 102, polling application 200', interceptor application 300' and database 140' load in system memory 114 as polling application 200'', interceptor application 300'' and database 140'', as shown in FIG. 1.

Figure 2:
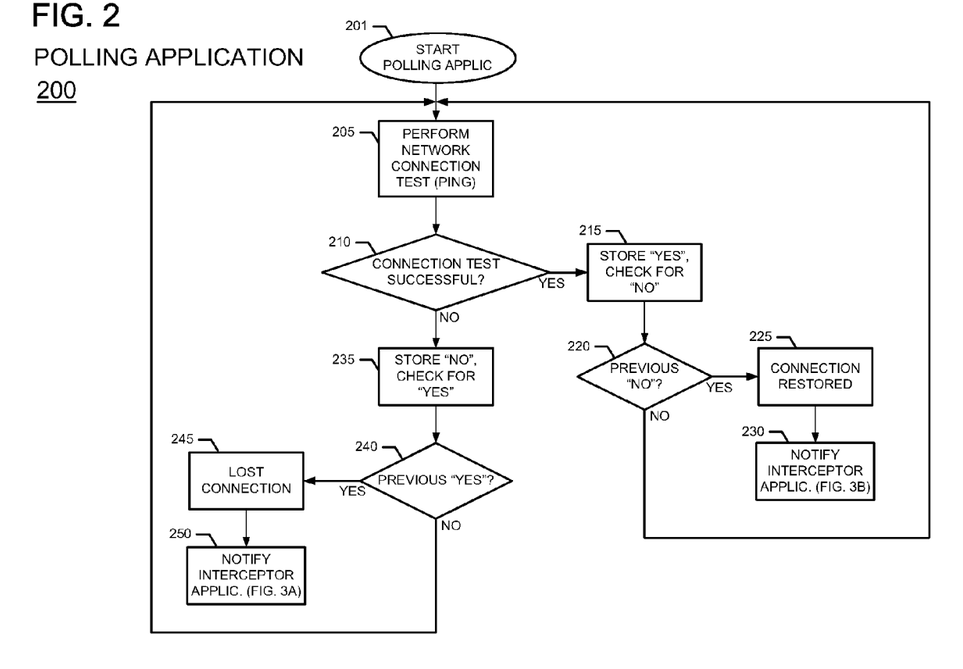
FIG. 2 is a flowchart that shows the methodology that a polling application employs in a client information handling system (IHS) in the networked system of FIG. 1.

FIG. 2 is a flow chart that depicts the methodology that polling application 200 employs in one embodiment. When polling application 200 loads in the client IHS 102, the polling process commences at a start block 201. Polling application 200 determines the status of the connection between client IHS 102 and network 104. Client IHS 102 exhibits either a connected status or a disconnected status with respect to network 104. For simplicity, if the network connection is inactive and not actively communicating, then the network connection exhibits an inactive status that corresponds to the disconnected status above. However, if the network connection is active and presently capable of communication, then the network connection exhibits an active status that corresponds to the connected status above. While modern computer networks tend to be robust, there are still times when the network may exhibit a disconnected status, such as during times of system maintenance or connection difficulties.

Polling application 200 performs a connection test 205 to determine if client IHS 102 currently exhibits a connected status or disconnected status with respect to network 104. For example, in one embodiment, client IHS 102 may ping another IHS on the network to see if a network connection currently exists. Polling application 200 then tests to determine if the connection test was successful, in decision block 210. If the connection test was successful, then polling application 200 stores a "YES" or equivalent in database 140', as per block 215. Polling application 200 then conducts a test to determine if the immediately preceding polling test stored a "NO" or equivalent in database 140', as per block 220. If decision block 220 determines that the previously stored polling test result is a "NO" and the result of the current polling test is a "YES", this means that system 100 restored the network connection between client IHS 102 and network 104, as per block 225. Upon such restoration of the network connection, polling application 200 so notifies interceptor application 300, shown later in FIG. 3B, as per block 230. However, if decision block 220 determines that the previously stored polling test was a "YES" and the result of the current polling test is also a "YES", then process flow continues back to perform network connection test block 205. Client 102 then repeats the network connection test as before. In this manner, polling application 200 continuously informs interceptor application 300 whether client IHS 102 currently exhibits the connected status or the disconnected status.

If the connection test of decision block 210 is unsuccessful, then polling application 200 stores a "NO" in database 140', as per block 235. Polling application 200 then checks to determine if the connection test result of the immediately preceding connection test was successful by checking to see if the last test result that the polling application stored in database 140' was a "YES", as per decision block 240. It decision block 240 finds that the previously stored test result was a "YES" and that the current test result is a "NO", this signifies a lost connection, as per block 245. In the event of such a lost connection, polling application 200 notifies interceptor application 300, as shown later in FIG. 3A, as per block 250. However, if decision block 240 determines that the immediately preceding stored test result was a "NO" and the current test result is also a "NO", then this signifies that client IHS 102 still exhibits a disconnected status. In this event, process flow continues back to block 205 at which polling application 200 continues to test for network connectivity.

Figure 3A:
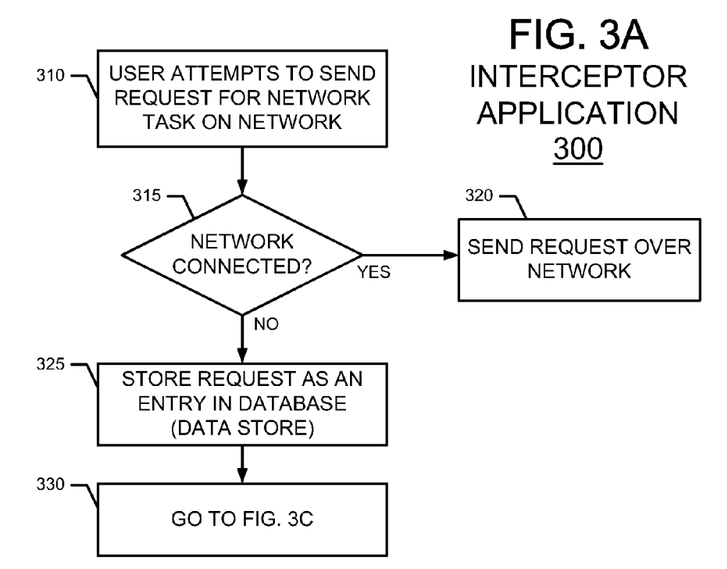
FIG. 3A shows a portion of a flowchart of the methodology that an interceptor application employs in the client IHS.

FIG. 3A is a flow chart that shows the methodology of a portion of interceptor application 300. Process flow of interceptor application 300 commences when block 250 of FIG. 2 notifies interceptor application 300 of a lost connection and the user of IHS 200 attempts to send a request for a network task over network 104, as per block 310. Client IHS 102 then performs a test to determine the present network connection status of client IHS 102, as per decision block 315. In actual practice, polling application 200 performs this network connection status test and reports the result to interceptor application 300. For example, notify interceptor application block 250 of polling application 200 informs interceptor application 300 with respect to a lost network connection (i.e. the network currently exhibits a disconnected status). Alternatively, notify interceptor application block 230 of polling application 200 informs interceptor application 300 with respect to a restored connection (i.e. the network currently exhibits a connected status). Thus, decision block 315 of interceptor application 300 of FIG. 3A may determine the current network connection status of client IHS 102 by receiving network status information from polling application 200.

If network connection decision block 315 determines that the network connection status of client IHS 102 is currently a network connected status, then client IHS 102 sends the request for a network task over network 104 to server IHS 106, as per block 320. However, if network connection decision block 315 determines that the network connection status of client IHS 102 is currently a network disconnected status, then interceptor application 300 intercepts the request for a network task and stores the request for a network task in a storage location such as database 140', as per block 325. In other words, interceptor application 300 stores such as request in a data store 120. Process flow then continues to the portion of interceptor application 300 that FIG. 3C depicts as discussed below, as per block 330. In actual practice, network interface 132 of client IHS 102 of FIG. 1 is the device in client IHS 102 that sends requests for network tasks over network 104. Network interface 132 effectively includes ports (not shown) over which requests for network tasks and network communications flow. In one embodiment, when the network connection is lost, interceptor application 300 intercepts requests for network tasks including associated information such as arguments until the restoration of the network connection. Then client IHS 102 sends the stored requests for network tasks once the network connection returns.

Figure 3B:
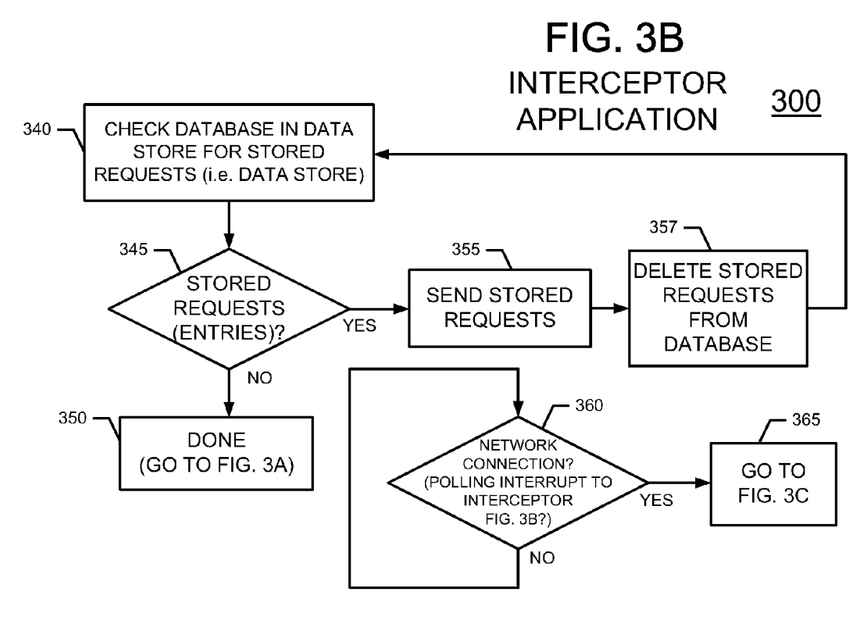
FIG. 3B shows another portion of a flowchart of the methodology that an interceptor application employs in the client IHS.
Figure 3C:
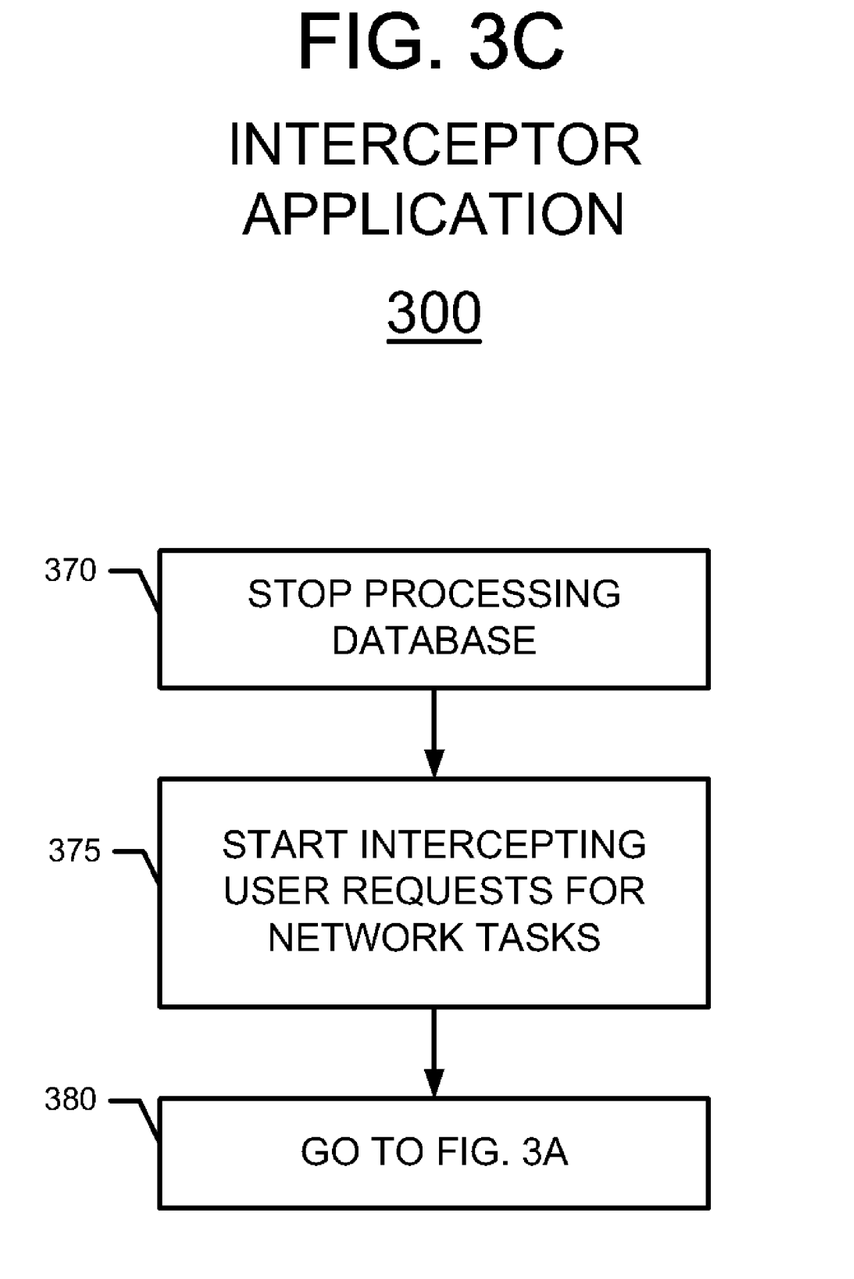
FIG. 3C shows a yet another portion of a flowchart of the methodology that an interceptor application employs in the client IHS.

FIG. 3B shows more detail with respect to the operation of interceptor application 300 when the network connection returns, namely when the network status of client IHS 102 changes from a disconnected status to a connected status. When polling application 200 notifies interceptor application 300 regarding the restored connection in notify interceptor application block 230, process flow continues to check database block 340 of FIG. 3B. Interceptor application 300 then performs a test at decision block 345 to determine if the database 140' includes any entries, namely stored requests for network tasks and associated information related to those tasks. If decision block 345 determines that database 140' stored no such entries while the network exhibited a disconnected status, then intercept replication 300 is done handling any previous network outage, as per block 350. Process flow then continues back to block 340 of FIG. 3A where the user again attempts to send a request for a network task.

However, if decision block 345 of FIG. 3B determines that database 140' did store requests for network tasks during a prior network outage for which the network exhibited a disconnected status, then interceptor application 300 retrieves the stored requests and transmits those requests over the now connected network, as per block 355. Interceptor application 300 then deletes the stored requests from database 140', as per block 357. Process flow continues back to check database block 340 and the process of FIG. 3B repeats. In one embodiment, when the interceptor 300 application is running as shown in FIG. 3B, the interceptor application may at any time receive an interrupt from the polling application. This interrupt signifies that the polling application found that the network connection is now lost and exhibits a disconnected status. More specifically, the interceptor application includes a decision block 360 that monitors the status of the network connection that it receives from the polling application. If the interceptor application receives an interrupt that indicates that the network connection is lost, then process flow continues from decision block 360 to the portion of interceptor application 300 shown in FIG. 3C, as per block 365. Otherwise, decision block 260 continues monitoring for an interrupt that indicates loss of the network connection.

FIG. 3C shows more detail with respect to the operation of interceptor application 300 when the polling application 200 notifies interceptor application 300 that the connection is lost. As indicated in the test of decision block 360 of FIG. 3B, when the network connection is lost, process flow continues to the portion of interceptor application shown in FIG. 3C, namely block 370. In response to receiving the notice that the connection is now lost, interceptor application 300 stops transmitting stored requests for network tasks from database 140'. Any un-sent requests remain stored in the database for future transmission. Interceptor application 300 again starts intercepting requests for network tasks, as per block 375. At block 380, process flow continues back to the portion of interceptor application 300 shown in FIG. 3A. Database 140' then starts storing requests for network tasks for the duration of the time while the network is disconnected or otherwise unavailable as per block 330.

In one embodiment, interceptor application 300 tests requests for network tasks to determine whether the request is for a non-user-interactive task or a user interactive task. In that case, interceptor application 300 intercepts and stores non-user-interactive tasks, but not the user-interactive tasks. A user-interactive task is a network task that requires the user's input or control while the network task executes. One example of a user-interactive task is interacting with a system on a network using a File Transfer Protocol (FTP). Other examples of user-interactive tasks include a telnet session and communicating with a user on the network using an instant messaging program. A non-user-interactive task is a task that does not require input or control by the user while the task executes. Examples of non-user-interactive tasks include sending an email and performing a command or transferring files to a remote system using Secure Shell (SSH) or Secure Copy (SCP) methods. In one embodiment, polling application 200 and interceptor application 300 execute as background applications while another application executes in the foreground in IHS 102. The disclosed technology enables the user of client IHS 102 to view his or her network connection transparently because the user does not need to be concerned whether the client IHS 102 has a network connection at any particular point in time. The disclosed IHS 102 makes it appear to the user that there is always a network connection, i.e. the network connection is transparent to the user. Should the network connection be lost at any particular point in time, the client IHS 102 handles this condition for the user by storing network requests and sending them later when network access returns. Of course, for an extremely long network outage, the user may determine that the network is down, but even in that scenario, when the network returns, the disclosed technology sends the requests stored during the network outage over the network.

Those skilled in the art will appreciate that the various structures disclosed can be implemented in hardware or software. Moreover, the methodology represented by the blocks of the flowcharts of FIG. 2 and FIGS. 3A-3C may be embodied in a computer program product, such as a media disk, media drive or other media storage such as computer program product medium 150 of FIG. 1.

In one embodiment, the disclosed methodology is implemented as a client polling application and a client interceptor application, namely sets of instructions (program code) in a code module which may, for example, be resident in system memory 114 of client IHS 102 of FIG. 1. Until required by client IHS 102, the set of instructions may be stored in another memory, for example, non-volatile storage 120 such as a hard disk drive, or in a removable memory such as an optical disk or floppy disk, or downloaded via the Internet or other computer network. Thus, the disclosed methodology may be implemented in a computer program product for use in a computer such as client IHS 102. It is noted that in such a software embodiment, code that carries out the functions depicted in FIG. 2 and FIGS. 3A-3C flow chart may be stored in system memory 114 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses a methodology and apparatus that provides transparent network connectivity for a client IHS user in one embodiment.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of communicating over a network between a client information handling system (IHS) and a server IHS, the method comprising:
monitoring the network, by a polling application in the client IHS, to determine if the client IHS currently exhibits a network connected status or a network disconnected status;
testing, by an interceptor application in the client IHS that communicates with the polling application, to determine if a request for a network task involves a user-interactive network task or a non-user-interactive network task, thus designating requests for user-interactive network tasks and requests for non-user-interactive network tasks, the request for a network task being directed by the client IHS to the server IHS;
transmitting, by the interceptor application, requests for user-interactive network tasks and non-user-interactive networks tasks over the network to the server IHS in response to the polling application determining that the client IHS currently exhibits the network connected status, the interceptor application storing requests for non-user-interactive network tasks in the data store in response to the polling application determining that the client IHS currently exhibits the network disconnected status and
transmitting, by the interceptor application, a stored request for a non-user-interactive network task in the data store to the server IHS when the polling application determines restoration of a network connection upon the network status transitioning from the network disconnected status to the network connected status.

2. The method of claim 1, further comprising determining, by the polling application, when the network status transitions from the network connected status to the network disconnected status.

3. The method of claim 1, further comprising deleting, by the interceptor application, a request for a network task in the data store after transmitting the request for a network task in the date store.

4. The method of claim 1, wherein the client executes the polling application and the interceptor application as background applications.

5. The method of claim 1, wherein the monitoring step comprises pinging, by the polling application, a remote device on the network to determine if the client currently exhibits a network connected status or a network disconnected status.

6. A client information handling system (IHS) comprising:
a processor;
a data store coupled to the processor;
a memory, coupled to the processor, the memory including:
a polling application that monitors a network to determine if the client IHS currently exhibits a network connected status or a network disconnected status; and
an interceptor application that communicates with the polling application, the interceptor application testing to determine if a request for a network task involves a user-interactive network task or a non-user-interactive network task, thus designating requests for user-interactive network tasks and requests for non-user-interactive network tasks, the request for a network task being directed by the client IHS to a server IHS, the interceptor application transmitting requests for user-interactive network tasks and non-user-interactive networks tasks over the network to the server IHS in response to the polling application determining that the client IHS currently exhibits the network connected status, the interceptor application storing requests for non-user-interactive network tasks in the data store in response to the polling application determining that the client IHS currently exhibits the network disconnected status;
wherein the interceptor application transmits a stored request for a non-user-interactive network task in the data store to the server IHS when the polling application determines restoration of a network connection upon the network status transitioning from the network disconnected status to the network connected status.

7. The client IHS of claim 6, wherein the polling application determines when the network status transitions from the network connected status to the network disconnected status.

8. The client IHS of claim 6, wherein the interceptor application deletes a stored request for a network task in the data store after transmitting the request for a network task in the data store.

9. The client IHS of claim 6, wherein the client IHS executes the polling application and the interceptor application as background applications.

10. A computer program product stored on a non-transitory computer operable medium for controlling a network connection of a client information handling system (IHS) to a network that includes a server IHS, the computer program product comprising:
a polling application that includes instructions for monitoring the network to determine if the client IHS currently exhibits a network connected status or a network disconnected status; and
an interceptor application that includes instructions for communicating with the polling application, the interceptor application including instructions for determining if a request for a network task involves a user-interactive network task or a non-user-interactive network task, thus designating requests for user-interactive network tasks and requests for non-user-interactive network tasks, the request for a network task being directed by the client IHS to a server IHS, the interceptor application further including instructions for transmitting, by the interceptor application, requests for user-interactive network tasks and non-user-interactive networks tasks over the network to the server IHS in response to the polling application determining that the client IHS currently exhibits the network connected status, the interceptor application storing requests for non-user-interactive network tasks in a data store in response to the polling application determining that the client IHS currently exhibits the network disconnected status, the interceptor application further including instructions for transmitting a stored request for a non-user-interactive network task in the data store to the server IHS when the polling application determines restoration of a network connection upon the network status transitioning from the network disconnected status to the network connected status.

11. The computer program product of claim 10, wherein the interceptor application includes instructions for deleting a request for a network task in the data store after transmitting the request for a network task in the data store.

12. The computer program product of claim 10, wherein the polling application and the interceptor application are background applications.

\* \* \* \* \*